United States Patent
Bower, III et al.

(10) Patent No.: US 8,578,144 B2
(45) Date of Patent: Nov. 5, 2013

(54) PARTIAL HIBERNATION RESTORE FOR BOOT TIME REDUCTION

(75) Inventors: Fred A. Bower, III, Durham, NC (US); Michael H. Nolterieke, Raleigh, NC (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 12/850,226

(22) Filed: Aug. 4, 2010

(65) Prior Publication Data

US 2012/0036346 A1    Feb. 9, 2012

(51) Int. Cl.
*G06F 9/00* (2006.01)
*G06F 15/177* (2006.01)

(52) U.S. Cl.
USPC .......... 713/2; 713/1; 713/100; 714/2; 714/15; 714/16; 714/100

(58) Field of Classification Search
USPC ............... 713/1, 2, 100; 714/2, 15, 16, 100
See application file for complete search history.

(56) References Cited

U.S. PATENT DOCUMENTS

| | | | |
|---|---|---|---|
| 7,624,260 B2 | 11/2009 | Ethier et al. | |
| 8,006,079 B2* | 8/2011 | Goodson et al. | 713/1 |
| RE42,727 E * | 9/2011 | Kang | 713/2 |
| 8,271,441 B1* | 9/2012 | Natanzon et al. | 707/634 |
| 2006/0041739 A1* | 2/2006 | Iwakura et al. | 713/2 |
| 2007/0112899 A1* | 5/2007 | Edwards et al. | 707/205 |
| 2009/0217021 A1 | 8/2009 | Goodson et al. | |
| 2010/0106754 A1* | 4/2010 | Condit et al. | 707/822 |

* cited by examiner

*Primary Examiner* — Jaweed A Abbaszadeh
(74) *Attorney, Agent, or Firm* — Cynthia G. Seal; Law Office of Jim Boice

(57) ABSTRACT

Checkpoint snapshots of segments of system memory are taken while an operating system is booting in a computer system. The segments of system memory are stored in non-volatile memory as hibernation files. In response to detecting a request for a system reboot of the OS, an affected hibernation file, which corresponds to an affected segment of system memory that will change during the system reboot of the OS, is identified. A restoration of the system memory via a wake-up from hibernation is then initiated. The wake-up from hibernation proceeds until the affected hibernation file is reached, such that initial steps in the system reboot are bypassed. Thereafter, subsequent steps, which are after the bypassed initial steps in the system reboot, are executed.

20 Claims, 4 Drawing Sheets

PARTIAL HIBERNATION RESTORE FOR BOOT TIME REDUCTION

BACKGROUND

The present disclosure relates to the field of computers, and specifically to the use of operating systems in computers. Still more particularly, the present disclosure relates to rebooting operating systems in computers.

BRIEF SUMMARY

A computer-implemented method, system and/or computer program product reduce Operating System (OS) boot time. Checkpoint snapshots of segments of system memory are taken while an operating system is booting in a computer system. The segments of system memory are stored sequentially in non-volatile memory as hibernation files. In response to detecting a request for a system reboot of the OS, an affected hibernation file, which corresponds to an affected segment of system memory that will change during the system reboot of the OS, is identified. A restoration of the system memory via a wake-up using a hibernation file that is previous to the affected hibernation file is then initiated, such that the initial steps in the system reboot are bypassed. Thereafter, subsequent steps, which are after the bypassed initial steps in the system reboot, are executed.

DETAILED DESCRIPTION

As will be appreciated by one skilled in the art, some or all of the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some or all of the features described in the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
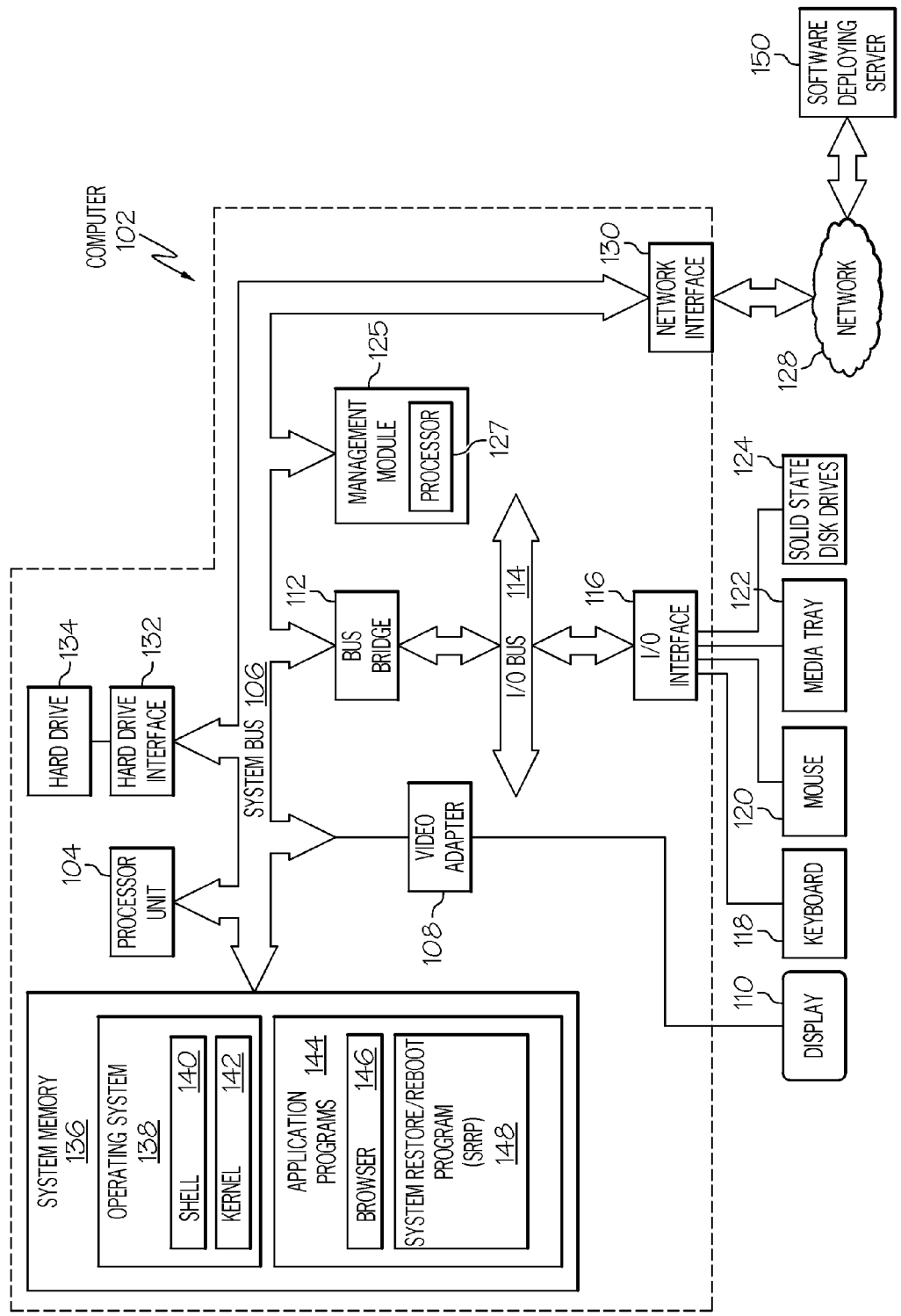
FIG. 1 depicts an exemplary computer that may be used in implementing the present disclosure.

With reference now to the figures, and in particular to FIG. 1, there is depicted a block diagram of an exemplary computer 102, which may be utilized by the present disclosure. Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and high-speed solid state disk drives 124. While the format of the ports connected to I/O interface 116 may be any known to those skilled in the art of computer architecture, in a preferred embodiment some or all of these ports are universal serial bus (USB) ports.

Computer 102 also comprises a management module 125. Management module 125 includes a separate processor 127, which is able to control the novel hibernation and reboot processes described herein independently of processor unit 104. Processor 127 is able to initially access system restore/reboot program (SRRP) 148, or a portion thereof, to perform the processes described herein. This initial access may be under the direction of processor unit 104. However, after this initial access, management module 125 can store the needed code from SRRP 148 in a local memory (not shown).

As depicted, in one embodiment, computer 102 is optionally able to communicate via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Figure 2:
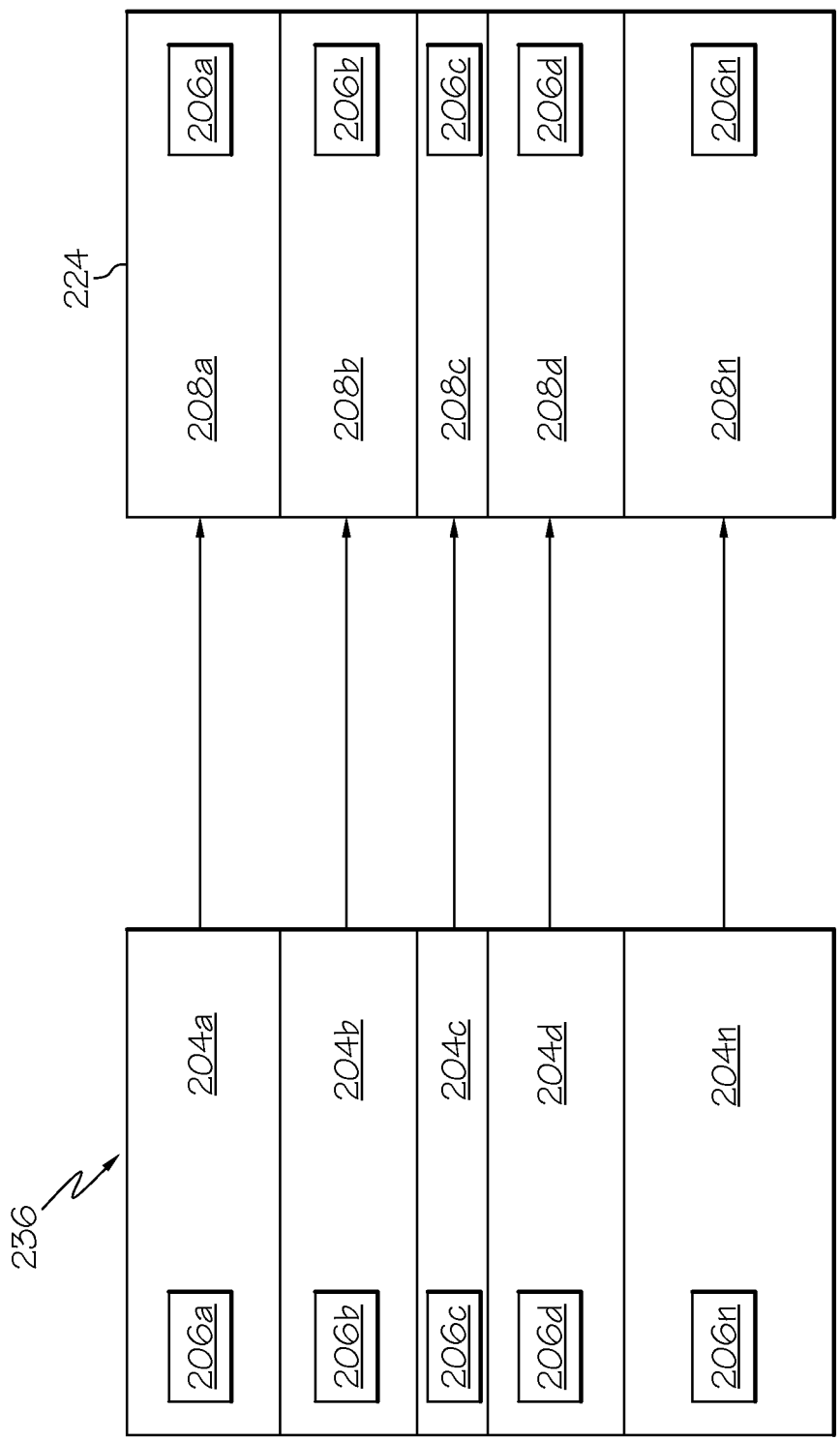
FIG. 2 illustrates a copying of individual segments of system memory content to a non-volatile storage during a hibernation process of a system.
Figure 3:
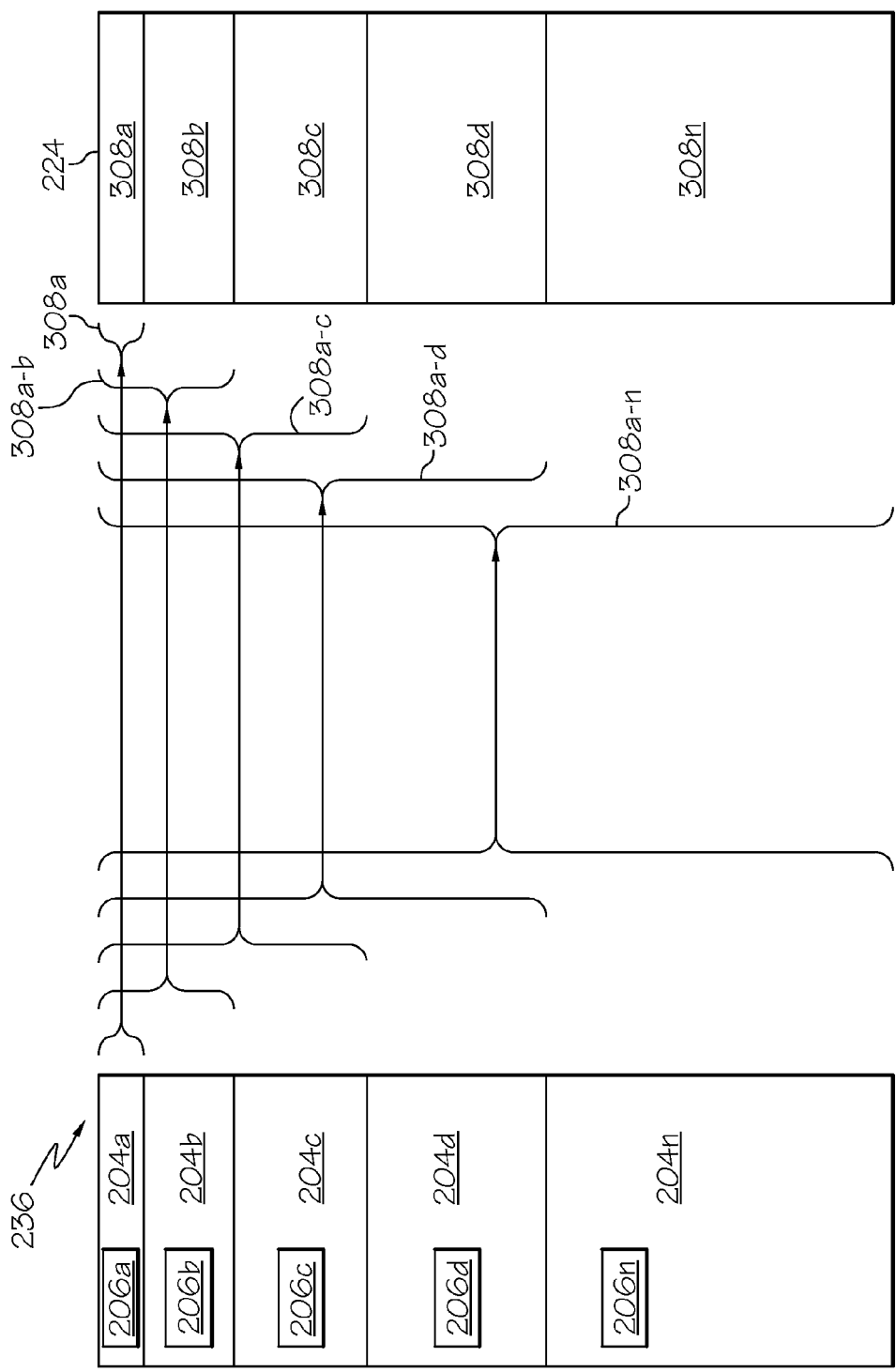
FIG. 3 depicts a copying of cumulative segments of system memory content to a non-volatile storage during a hibernation process of a system.
Figure 4:
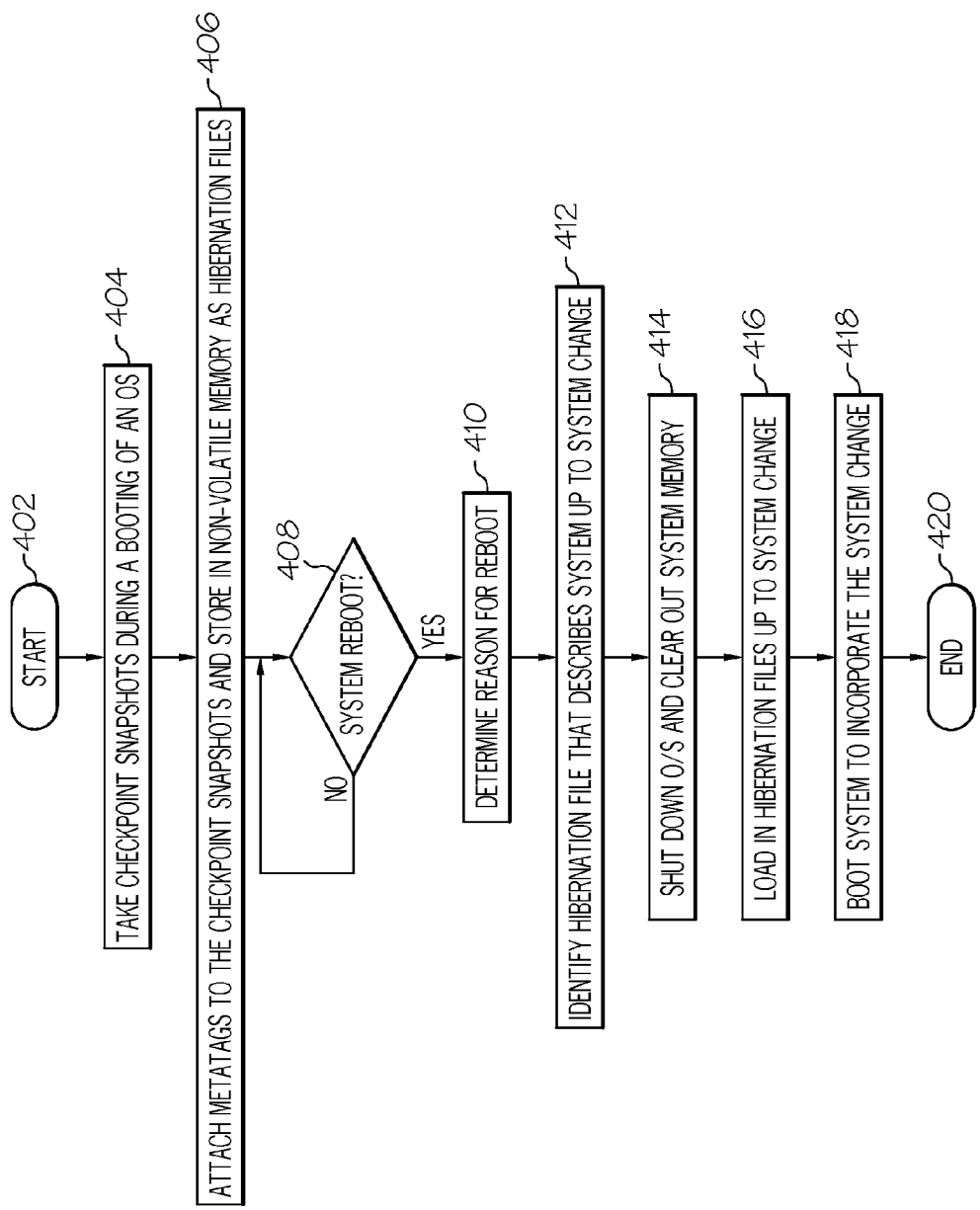
FIG. 4 is a high level flow chart of one or more exemplary steps taken by a processor to reduce Operating System (OS) reboot time.

Application programs 144 also include a system restore/reboot program (SRRP) 148, which, when executed, performs some or all of the processes described in FIGS. 2-4. In one embodiment, SRRP 148 is downloadable from software deploying server 150 in an on-demand basis, such that units of code are downloaded only when needed. In another embodiment, some or all of the processes executed by SRRP 148 are performed by software deploying server 150 itself, thus minimizing the use of resources within computer 102.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

With reference now to FIG. 2, a representation of content from a system memory 236 (e.g., system memory 136 shown in FIG. 1) being copied to a non-volatile storage 224 (e.g., hard drive 134, solid state disk drives 124, etc., also shown in FIG. 1) during a hibernation process of a system is presented. Hibernation is defined as moving content of a main system memory (e.g., system memory 236) to a non-volatile memory (e.g., non-volatile storage 224). This moved content is referred to as hibernation files. Hibernation allows a system to save power, since the main system memory and other system components can then be powered down. The system can later awake by reloading the main system memory with the hibernation files. In the present disclosure, the hibernation may be a true hibernation, which may be prompted by a lack of activity that causes the system to partially power down (e.g., shut down system memory). In one embodiment, the hibernation is actually a pseudo-hibernation, in which the system memory retains all of its contents, but still copies (instead of moving) the contents of the system memory to non-volatile memory. Whether true hibernation or pseudo-hibernation occurs, the present disclosure presents two types of hibernation files: individual segment hibernation files and cumulative hibernation files.

FIG. 2 depicts a creation and storage of individual segment hibernation files 208a-n, which can later be selectively reassembled into a hibernation file used to restore system memory. As depicted in FIG. 2, each of the segments 204a-n may be tagged with a corresponding metatag 206a-n. These metatags 206a-n describe at least a sequential position of the segments 204a-n during the boot/reboot process, and may also describe what is occurring at that sequential position. For example, the first part of a boot/reboot may be the loading of a kernel (e.g., kernel 142 shown in FIG. 1). This kernel may be stored in segment 204a of system memory 236. The associated metatag may not only describe that installation of the kernel is the first part of the boot/reboot process, but also describes where the kernel is located within system memory. The segments 204a-n are copied to non-volatile storage 224 as segment hibernation files 208a-n, optionally with the metatags 206a-n as well. In the embodiment depicted in FIG. 2, the segment hibernation files 208a-n are selectively assembled into cumulative hibernation files during the wakeup/reboot process described herein. That is, when utilizing segment hibernation files 208a-n, the wakeup/reboot process described herein includes an additional step of creating a cumulative hibernation file. This cumulative hibernation file is used to re-install the system states in system memory 236 up to the point of the reboot action at which the reboot requires the contents of the system memory 236 to be changed. At this point, the wake-up process (using the cumulative hibernation file) suspends, and the reboot process starts at an interim location of the reboot process. Thus, contents of the system memory are unchanged by the wake-up portion of the process, while subsequent contents of the system memory are changed by the reboot process (starting at the appropriate interim position/location/step of the reboot process).

FIG. 3 depicts a creation and storage of cumulative hibernation files, one of which can be selected to restore system memory up to a point in reboot at which true rebooting operations are required. As depicted in FIG. 3, cumulative hibernation file 308a includes only the contents from segment 204a. Cumulative hibernation file 308a-b is a single hibernation file that includes the contents of segments 204a-b, cumulative hibernation file 308a-c is a single hibernation file that includes the contents of segments 204a-c, etc. Cumulative file 308a-e includes all of the contents of system memory 236, and therefore is only useful if waking up from a normal hibernation state without any additional rebooting operations.

As an example, assume in FIG. 3 that a reboot will only affect the contents of system memory 236 starting with segment 204c. During a wakeup from hibernation, hibernation file 308a-b can repopulate system memory 236 with the contents that were previously in the unaffected segments 204a and 204b. Thereafter, a mid-stream true boot process begins, such that the affected segment 204c is updated according to a restart/reboot process.

Note that in either embodiment depicted in FIG. 2 or FIG. 3, if a true hibernation is occurring, then the segments/files are "moved" from system memory 236 to non-volatile storage 224. If a pseudo-hibernation is occurring, then the segments/files are "copied" from system memory 236 to non-volatile storage 224.

With reference now to FIG. 4, a high level flow chart of one or more exemplary steps taken by a processor to reduce Operating System (OS) reboot time is presented. After initiator block 402, checkpoint snapshots are taken while an OS is booting up (block 404). As the name suggests, checkpoint snapshots may be taken at pre-defined checkpoints during a system boot. The checkpoints may be set according to what part of the boot process is occurring (e.g., installing the kernel, installing services, receiving a user login, performing post-login activities such as loading in user-defined configuration for e-mail, screen settings, etc.), or they may simply be set at predetermined times during the execution of the booting process. The checkpoint snapshots are of system states that are described in segments of system memory, as depicted in FIGS. 2-3. These system states describe contents of memory, registers, cache, etc., as well as the state of peripheral devices, input/output states, communication statuses with other computers, etc.

Metatags identifying the order and/or function of each step in the boot operations are attached to the checkpoint snapshots, and the tagged checkpoint snapshots are stored in non-volatile memory as hibernation files (block 406). This storage of the checkpoint snapshots (with or without the metatags) to non-volatile memory may be the result of a true hibernation (in which contents of system memory are wiped out by a "move" operation that creates the hibernation files), or a pseudo-hibernation (in which contents of system memory remain intact while copying the contents of system memory in order to create the hibernation files), such that the computer system never actually goes into hibernation.

A request to the system for an OS system reboot may be detected (query block 408). If so, this reboot may be needed due to a software update process (e.g., updating an application program), a hardware discovery process (e.g., adding a new peripheral, which requires restarting the system in order to be initialized), an application recovery process (e.g., reloading an application that has been corrupted, dumped from memory, etc.), etc. As described in block 410, a reason for the reboot may be determined, in order to identify which segment of system memory (and its corresponding hibernation file) will be affected. That is, some of the segments of system memory will be unaffected during the reboot, and therefore can simply be used to construct an applicable hibernation file. Other segments of system memory, however, will be changed by the reboot, and thus the corresponding hibernation files are not usable in their stored form. Thus, the present disclosure uses hibernation files to restore the system memory as long as the system memory would be unchanged by the sequential reboot process steps. As soon as the reboot process affects the system memory (i.e., causes a change to some portion of system memory), the "wake up" from hibernation stops, and the true reboot process begins from an interim point (instead of executing the entire reboot process).

Thus, as described in block 412, an affected hibernation file that corresponds to an affected segment of system memory (e.g., a segment of system memory that will be changed by the reboot process) is identified. The OS is then shut down and system memory is cleared out (block 414). The clearing out of system memory may be performed in various ways, as now described.

In one embodiment, an assumption is made that any changes to system memory during operation of the computer system since initially booting the computer system are inconsequential. In this embodiment, the hibernation files that were previously stored in non-volatile memory (during a pseudo-hibernation) will be used "as is" during wakeup/reboot, and the system memory is simply wiped out before reboot.

In another embodiment, an assumption is made that changes to system memory during operation of the computer system since initially booting are significant, but that any change to system memory during operation of the computer system was contemporaneously reflected in the hibernation files. In this embodiment, the hibernation files, that were previously stored in non-volatile memory (during a pseudo-hibernation) have been updated accordingly, and thus are trustworthy, such that the system memory can be safely wiped out before reboot.

In another embodiment, an assumption is made that changes to system memory during operation of the computer system are significant, but that these changes were not reflected in the corresponding hibernation files. In this embodiment, the current contents of system memory are moved to non-volatile memory as updated hibernation files before wiping out the contents of the system memory prior to reboot.

As reflected in block 416, a restoration of the system memory occurs via a wake-up from hibernation using the appropriate hibernation file (see FIG. 3) or by assembling initial partial hibernation files into a cumulative hibernation file (see FIG. 2). However, this wake-up from hibernation proceeds only up to the point at which the affected hibernation file is reached, such that initial steps in the system reboot are bypassed. That is, the system "reboots" by simply reloading the hibernation file into system memory up to the point that a true reboot of the operating system is required. Note that this true reboot entails more than simply moving files into system memory. Rather, a true reboot initializes peripheral devices, sets drivers, etc., which may not need to be redone during a reboot if contents of early segments of the system memory are unaffected by the reboot. Thus, the present disclosure allows unchanged portions of the system memory to be simply reloaded from the hibernation files, followed by the execution of a true reboot sequence that picks up in the middle of the full reboot process. As described in block 418, after the initial steps of the system reboot have been bypassed by loading in the hibernation files, then subsequent steps in the system reboot are executed using a modified reboot process (in which the reboot starts "mid-stream"). The process ends at terminator block 420.

Note that in one embodiment, this combination wake-up/reboot process is under the control of a processor on which the OS actually runs. In another embodiment, however, that processor may not have the capacity, intelligence, and/or role/authorization to perform such a wake-up/reboot. In this embodiment, therefore, control of the wake-up/reboot is by a management module (e.g., management module 125 shown in FIG. 1), which utilizes a different processor than the processor that will be implementing the OS that is rebooted using the hibernation files as described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer-implemented method of reducing operating system (OS) reboot time in a computer system, the computer implemented method comprising:
    a processor taking checkpoint snapshots of system states during a booting of an OS in a computer system;
    the processor storing the checkpoint snapshots in non-volatile memory as hibernation files;
    the processor, in response to detecting a request for a system reboot of the OS, identifying an affected hibernation file that corresponds to an affected segment of system memory that will change during the system reboot of the OS;
    the processor, in response to detecting the request for the system reboot of the OS, directing a restoration of the system memory via a wake-up from hibernation, wherein the wake-up from hibernation proceeds until the affected hibernation file is reached such that initial steps in the system reboot are bypassed; and
    the processor directing an execution of subsequent steps in the system reboot that occur after the bypassed initial steps in the system reboot.

2. The computer implemented method of claim 1, wherein the system states are described in segments of system memory.

3. The computer implemented method of claim 1, wherein each of the hibernation files represents a cumulative copy of the system states up to a particular checkpoint.

4. The computer-implemented method of claim 1, further comprising:
    the processor tagging the hibernation files with metatags that correspond to progressive steps in the system reboot.

5. The computer-implemented method of claim 1, further comprising:
    the processor storing the hibernation files in an array of solid state disk drives.

6. The computer-implemented method of claim 1, further comprising:
    the processor determining that a software update process will cause the affected segment of system memory to be changed.

7. The computer-implemented method of claim 1, further comprising:
    the processor determining that a hardware discovery process will cause the affected segment of system memory to be changed.

8. The computer-implemented method of claim 1, further comprising:
    the processor determining that an application recovery process will cause the affected segment of system memory to be changed.

9. The computer-implemented method of claim 1, wherein the processor is an OS executing processor that performs the system reboot of the OS.

10. The computer-implemented method of claim 1, wherein the processor is located within a management module, and wherein the processor within the management module is different from an OS executing processor that will utilize an OS that is being rebooted.

11. The computer-implemented method of claim 1, wherein the hibernation files are created during a pseudo-hibernation of the computer system, and wherein the computer-implemented method further comprises:
    the processor updating the hibernation files as changes occur to the segments of the system memory during operation of the computer system.

12. A computer program product for reducing Operating System (OS) boot time, the computer program product comprising:
    a non-transitory computer readable storage media;
    first program instructions to take checkpoint snapshots of system states during a booting of an OS in a computer system;
    second program instructions to store the checkpoint snapshots in non-volatile memory as hibernation files;
    third program instructions to, in response to detecting a request for a system reboot of the OS, identify an affected hibernation file that corresponds to an affected segment of system memory that will change during the system reboot of the OS;
    fourth program instructions to, in response to detecting the request for the system reboot of the OS, direct a restoration of the system memory via a wake-up from hibernation, wherein the wake-up from hibernation proceeds until the affected hibernation file is reached such that initial steps in the system reboot are bypassed; and
    fifth program instructions to direct an execution of subsequent steps in the system reboot that occur after the bypassed initial steps in the system reboot; and wherein the first, second, third, fourth, and fifth program instructions are stored on the non-transitory computer readable storage media.

13. The computer program product of claim 12, further comprising:
    sixth program instructions to tag the hibernation files with metatags that correspond to progressive steps in the system reboot, wherein the sixth program instructions are stored on the non-transitory computer readable storage media.

14. The computer program product of claim 12, further comprising:
    sixth program instructions to store the hibernation files in an array of solid state disk drives, wherein the sixth program instructions are stored on the non-transitory computer readable storage media.

15. The computer program product of claim 12, further comprising:
    sixth program instructions to determine that a hardware discovery process will cause the affected segment of system memory to be changed, wherein the sixth program instructions are stored on the non-transitory computer readable storage media.

16. The computer program product of claim 12, further comprising:
    sixth program instructions to determine that an application recovery process will cause the affected segment of system memory to be changed, wherein the sixth program instructions are stored on the non-transitory computer readable storage media.

17. A computer system comprising:
a processor, a computer readable memory, and a non-transitory computer readable storage media;
first program instructions to take checkpoint snapshots of system states during a booting of an OS in a computer system;
second program instructions to store the checkpoint snapshots in non-volatile memory as hibernation files;
third program instructions to, in response to detecting a request for a system reboot of the OS, identify an affected hibernation file that corresponds to an affected segment of system memory that will change during the system reboot of the OS;
fourth program instructions to, in response to detecting the request for the system reboot of the OS, direct a restoration of the system memory via a wake-up from hibernation, wherein the wake-up from hibernation proceeds until the affected hibernation file is reached such that initial steps in the system reboot are bypassed; and
fifth program instructions to direct an execution of subsequent steps in the system reboot that occur after the bypassed initial steps in the system reboot; and wherein the first, second, third, fourth and fifth program instructions are stored on the non-transitory computer readable storage media for execution by the processor via the computer readable memory.

18. The computer system of claim 17, further comprising:
sixth program instructions to tag the hibernation files with metatags that correspond to progressive steps in the system reboot, wherein the sixth program instructions are stored on the non-transitory computer readable storage media for execution by the processor via the computer readable memory.

19. The computer system of claim 17, further comprising:
sixth program instructions to store the hibernation files in an array of solid state disk drives, wherein the sixth program instructions are stored on the non-transitory computer readable storage media for execution by the processor via the computer readable memory.

20. The computer system of claim 17, further comprising:
sixth program instructions to determine that a software update process will cause the affected segment of system memory to be changed, wherein the sixth program instructions are stored on the non-transitory computer readable storage media for execution by the processor via the computer readable memory.

* * * * *